United States Patent
Keskula et al.

(10) Patent No.: US 9,899,691 B2
(45) Date of Patent: Feb. 20, 2018

(54) SYSTEMS AND METHODS FOR DETECTING ANODE CONTAMINATION IN A FUEL CELL SYSTEM

(71) Applicant: GM GLOBAL TECHNOLOGY OPERATIONS LLC, Detroit, MI (US)

(72) Inventors: Donald H. Keskula, Oxford, MI (US); Mark P. Adams, Victor, NY (US); Kenneth L. Kaye, Rochester Hills, MI (US); Swaminatha P. Kumaraguru, Rochester Hills, MI (US); Jingxin Zhang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 14/807,835

(22) Filed: Jul. 23, 2015

(65) Prior Publication Data
US 2017/0025693 A1    Jan. 26, 2017

(51) Int. Cl.
| | |
|---|---|
| H01M 8/04 | (2016.01) |
| H01M 8/04223 | (2016.01) |
| H01M 8/04537 | (2016.01) |
| H01M 16/00 | (2006.01) |

(52) U.S. Cl.
CPC ... *H01M 8/04223* (2013.01); *H01M 8/04641* (2013.01); *H01M 8/04649* (2013.01); *H01M 16/006* (2013.01); *H01M 2220/20* (2013.01); *H01M 2250/20* (2013.01); *Y02T 90/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,329,092 | B1 * | 12/2001 | Maeda | H01M 8/04447 429/412 |
| 7,577,536 | B1 * | 8/2009 | Chisholm | H01M 8/04559 702/64 |
| 2004/0091759 | A1 * | 5/2004 | Harrington | G01R 31/3662 429/431 |
| 2014/0186726 | A1 * | 7/2014 | Lebzelter | H01M 8/04492 429/413 |
| 2015/0376803 | A1 * | 12/2015 | Wang | H01M 4/8605 429/480 |

\* cited by examiner

*Primary Examiner* — Imran Akram
(74) *Attorney, Agent, or Firm* — Phillips Ryther & Winchester; John P. Davis (57) ABSTRACT

System and methods for detecting anode contamination in a fuel cell system are presented. In certain embodiments, a high frequency resistance response of a fuel cell system may be measured at a plurality of frequencies. In some embodiments, the rate of change of high frequency resistance response over time may differ at varied frequencies based on an amount of anode contamination in the fuel cell system. Accordingly, systems and methods disclosed herein may compare high frequency resistance responses taken at a plurality of measured frequencies to detect anode contamination and initiate associated recovery procedures in the fuel cell system.

14 Claims, 5 Drawing Sheets

SYSTEMS AND METHODS FOR DETECTING ANODE CONTAMINATION IN A FUEL CELL SYSTEM

TECHNICAL FIELD

This disclosure relates to systems and methods for detecting anode contamination in a fuel cell system. More specifically, but not exclusively, this disclosure relates to systems and methods for detecting anode contamination in a fuel cell system based on a measured high frequency resistance of the fuel cell system.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., using electric drive motors and the like) and/or via an intermediate battery system. Hydrogen is one possible fuel that may be used in a FC system. Hydrogen is a clean fuel that can be used to efficiently produce electricity in a FC. A hydrogen FC system is an electrochemical device that may include an electrolyte between an anode and a cathode. The anode receives hydrogen gas and the cathode receives oxygen or air. The hydrogen gas is dissociated in the anode to generate free hydrogen protons and electrons. The hydrogen protons may be selectively conducted across the electrolyte. The electrons from the anode cannot pass through the electrolyte, and thus are directed through a load to perform work before being sent to the cathode. The hydrogen protons react with the oxygen and the electrons in the cathode to generate water.

Proton exchange membrane fuel cells ("PEMFC") may be used in FC-powered vehicles. A PEMFC generally includes a solid polymer electrolyte proton conducting membrane, such as a perfluorosulfonic acid membrane. An anode and cathode included in a PEMFC may include finely divided catalytic particles (e.g., platinum particles) supported on carbon particles and mixed with an ionomer. A catalytic mixture may be deposited on opposing sides of the membrane.

During operation, a PEMFC may experience contamination in the anode and cathode electrodes due to a variety of mechanisms and/or processes that may reduce performance of the PEMFC over time. Certain PEMFC performance losses may be recoverable by initiating recovery procedures in the PEMFC, while others may not be recoverable (e.g., losses attributable to electrode degradation). It may be difficult, however, to differentiate recoverable losses (e.g., losses from anode and/or cathode contamination) from non-recoverable losses.

SUMMARY

During operation, an anode electrode of a FC system may become contaminated over time with a variety of containments including, for example, carbon monoxide, thereby reducing performance of the system. Systems and methods are presented for detecting anode contamination in a FC system based on a measured high frequency resistance ("HFR") of the FC system. In certain embodiments, the disclosed systems and methods may be used in connection with detecting anode contamination and initiating a recovery operation configured to recover certain performance loss in the FC system in response to detecting anode contamination.

HFR of a FC system and/or a constituent cell may represent an in-plane impedance on an anode and cathode of the system and/or cell. A measured HFR of a FC may be impacted by a variety of factors. For example, certain steady state components impacting HFR may be inherent in a design of a FC. Electrode hydration may further impact a measured HFR. Consistent with embodiments disclosed herein, anode contamination may further impact measured HFR of a FC.

Due to the variety of factors impacting measured HFR of a FC (e.g., steady state components, humidification, anode contamination, etc.), it may be difficult to differentiate between the various factors based solely on a single HFR measurement. For example, it may be difficult to differentiate between changes in anode humidification impacting HFR in a FC from changes in anode contamination based solely on a single HFR measurement.

Consistent with embodiments disclosed herein, HFR response of a FC may be measured at a plurality of frequencies. In certain embodiments, the rate of change of HFR response over time may differ at varied frequencies based on an amount of anode contamination in the FC. Accordingly, by comparing HFR frequency responses taken at a plurality of measured frequencies, anode contamination in a FC may be detected.

In some embodiments, a method for detecting anode contamination in a FC system may include measuring a first high frequency resistance response of the fuel cell system (e.g., a single cell and/or a plurality of cells) at a first frequency and measuring a second high frequency resistance response of the fuel cell system at a second frequency different than the first frequency. In certain embodiments, the first frequency may comprise a frequency in a first frequency range and the second frequency may comprise a frequency in a second frequency range higher than the first frequency range. For example, in some embodiments, the first frequency may comprise a frequency equal to or greater than 200 Hz (e.g., 1 kHz) and the second frequency may comprise a frequency equal to or less than 6 kHz. The first frequency response and the second frequency response may be measured synchronously and/or asynchronously within a defined time and/or otherwise an event window (e.g., during a single run cycle or the like), and may be measured using the same current measurement channel and voltage measurement channel.

A difference between the first high frequency resistance response and the second high frequency resistance response may be determined and the difference may be compared against a threshold. In some embodiments, the threshold may comprise a threshold indicating a threshold level of anode contamination in the fuel cell system. Based on a determination that the difference exceeds the threshold, a recovery procedure in the fuel cell system may be initiated. In certain embodiments, the recovery procedure may include introducing oxygen in the fuel cell system to oxidize carbon monoxide.

In certain embodiments, the aforementioned method may be performed by a FC control system and/or any other computing system and/or implemented using a non-transitory computer-readable medium storing associated executable instructions.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Systems and methods disclosed herein may be utilized in connection with detecting anode contamination in a FC system based on HFR response of the FC measured at a plurality of frequencies. Particularly, by comparing HFR frequency responses taken at a plurality of measurement frequencies, anode contamination in a FC may be detected.

In certain embodiments, performance losses associated with anode contamination in the FC may be recoverable by initiating voltage recovery procedures in the FC system. Certain recovery procedures may, however, cause some minimal unrecoverable degradation to the FC system. Accordingly, recovery procedures may be initiated when voltage loss recovery may be effectively realized so as to reduce unrecoverable degradation. Embodiments of the disclosed systems and methods may be utilized in accurately detecting the occurrence of anode contamination in the FC system and initiating recovery procedures in response to the same.

Figure 1:
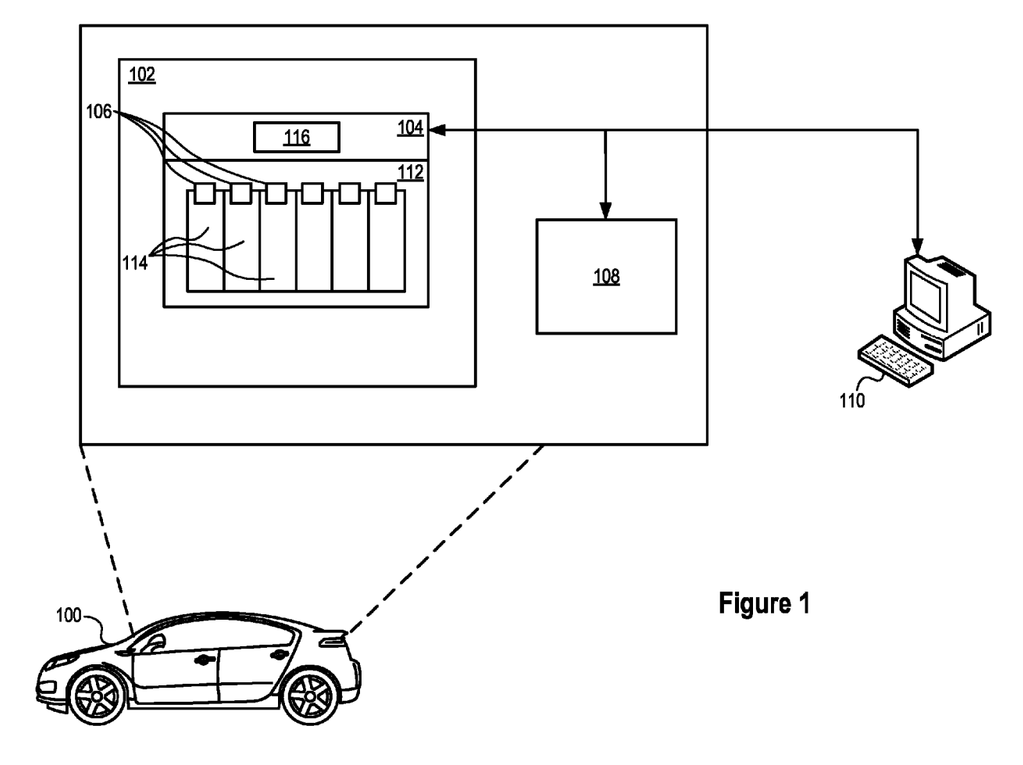
FIG. 1 illustrates a diagram of a FC system included in a vehicle consistent with embodiments disclosed herein.

FIG. 1 illustrates a diagram of a FC system 102 included in a vehicle 100 consistent with embodiments disclosed herein. The vehicle system 100 may be a motor vehicle, a marine vehicle, an aircraft, and/or any other type of vehicle, and may include any suitable type of drivetrain for incorporating the systems and methods disclosed herein. Additional embodiments of the disclosed systems and methods may be utilized in connection with any other type of FC system 102 including, for example, stationary FC systems (e.g., back-up power for a building and/or the like).

The vehicle 100 may include a FC system 102 including a FC stack 112 that, in certain embodiments, may be coupled with a high-voltage ("HV") battery system (not shown). The HV battery system may be used to power electric drivetrain components (not shown) of the vehicle 100. In further embodiments, the FC stack 112 may be coupled with a low voltage battery and may be configured to supply electric energy to a variety of vehicle 100 systems including, for example, lighting systems, climate control systems, and the like. In yet further embodiments, the FC system 102 may be configured to directly power certain vehicle systems. In some embodiments, the FC system 102 may comprise a single cell or, as illustrated, may include multiple cells 114 arranged in a stack configuration.

The FC stack 112 may be associated with a FC control system 104. The FC control system 104 may be configured to monitor and control certain operations of the FC stack 112. For example, the FC control system 104 may be configured to monitor and control adjustable performance parameters and/or manage charge and discharge operations of the FC stack 112. In certain embodiments, the FC control system 104 may be communicatively coupled with one or more sensors 106 (e.g., voltage sensors, current sensors, and/or the like, etc.) and/or other systems configured to enable the FC control system 104 to monitor and control operations of the FC stack 112 and/or its constituent cells 114.

Consistent with embodiments disclosed herein, the sensors 106 in communication with the FC stack 112 may provide the FC control system 104 and/or other systems (e.g., internal vehicle computer system 108 and/or an external computer system 110) with information that may be used to measure HFR responses of the FC system at a variety of frequencies and/or detect anode contamination based on the same. The FC control system 104 may further be configured to provide information to and/or receive information from other systems included in the vehicle 100. For example, the FC control system 104 may be communicatively coupled with an internal vehicle computer system 108 and/or an external computer system 110.

The control system 104 may comprise an internal control system, an external control system, and/or any other vehicle control and/or computer system. In further embodiments, the control system 104 may be configured to provide information to and/or receive information from other systems included in the vehicle 100 and/or an operator of the vehicle 100. Although illustrated in connection with a single control system 104, it will be appreciated that embodiments of the disclosed systems and methods may be implemented using a plurality of suitable control and/or computing systems.

In some embodiments, the control system 104, the internal vehicle computer system 108 and/or external computer system 110 may comprise a module 116 that when executed by the control system 104, and/or the internal vehicle computer system 108 and/or external computer system 110, cause the systems 104, 108, and/or 110 to implement embodiments of the disclosed systems and methods. For example, in some embodiments, the module 116 may cause the systems 104, 108, and/or 110 to measure HFR responses of the FC system at a variety of frequencies and/or detect anode contamination based on the same. In further embodiments, the module 116 may cause the systems 104, 108, and/or 110 to initiate a recovery procedure in the FC system based, at least in part, on the detected anode contamination.

It will be appreciated that a number of variations can be made to the architecture, relationships, and examples presented in connection with FIG. 1 within the scope of the inventive body of work. For example, certain device and/or system functionalities described above may be integrated into a single device and/or system and/or any suitable combination of devices and/or systems in any suitable configuration. Similarly, although certain embodiments of the disclosed systems and methods are described as being implemented by the FC control system 104, it will be appreciated that the internal vehicle computer system 108, external computer system 110, and/or any other computer system may implement embodiments disclosed herein. Thus it will be appreciated that the architecture, relationships, and examples presented in connection with FIG. 1 are provided for purposes of illustration and explanation, and not limitation.

Figure 2:
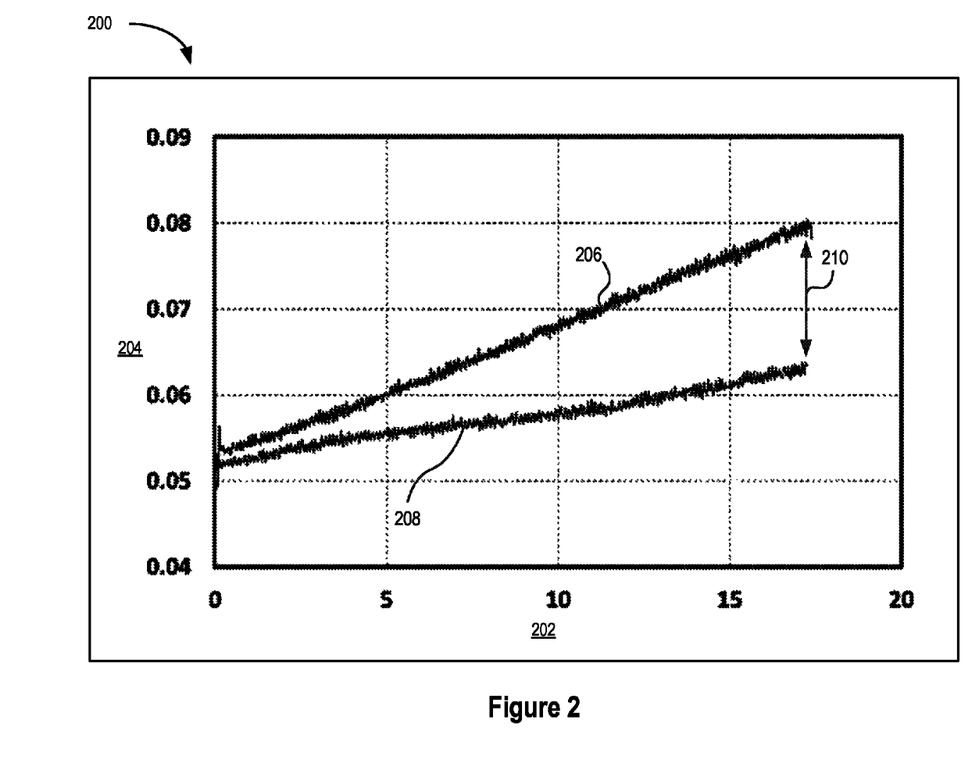
FIG. 2 illustrates a graph showing HFR responses of a FC at a plurality of measurement frequencies consistent with embodiments disclosed herein.

FIG. 2 illustrates a graph 200 showing HFR responses 206, 208 of a FC at a plurality of measurement frequencies consistent with embodiments disclosed herein. In the illustrated graph 200, the x-axis 202 represents operational run time of a FC system (e.g., measured in hours) and the y-axis 204 represents measured HFR of the FC system (e.g., measured in $\Omega cm^2$).

Consistent with embodiments disclosed herein, anode contamination in a FC system may be detected based on HFR responses 206, 208 of the FC measured at a plurality of frequencies. In some embodiments, HFR measurements may be taken at set current densities (e.g., 1.5 A/cm$^2$), operating temperatures (e.g., 87 C), and/or relative humidification levels. In certain embodiments, HFR measurements may be taken at 1 kHz (e.g., HFR response 206) and at 6 kHtz (e.g., HFR response 208) measurement frequencies, although it will be appreciated that other measurement frequencies may be used in connection with the disclosed embodiments. For example, HFR measurements may be taken at frequencies equal to or greater than 200 Hz and equal to or less than 6 kHz. HFR response may be measured in a variety of ways including, for example, by measuring an impedance in response injecting a signal of a particular frequency and/or a plurality of signals access the FC stack.

In certain embodiments, the rate of change of HFR response 206, 208 over time 200 may differ at varied frequencies based on an amount of anode contamination in the FC. Accordingly, by comparing HFR frequency responses 206, 208 taken at a plurality of measured frequencies, anode contamination in a FC may be detected. For example, as illustrated, when a difference 210 between HFR frequency responses 206, 208 exceeds a particular threshold, it may be determined that contamination in the anode has reached a threshold level and that anode contamination recovery procedures may be initiated. In certain embodiments, the thresholds, which may be obtained through FC characterization testing or the like) may be included in a look-up table and/or any other suitable logic correlating differences between HFR frequency responses at varied frequencies and anode contamination levels that trigger a recovery procedure.

Figure 3A:
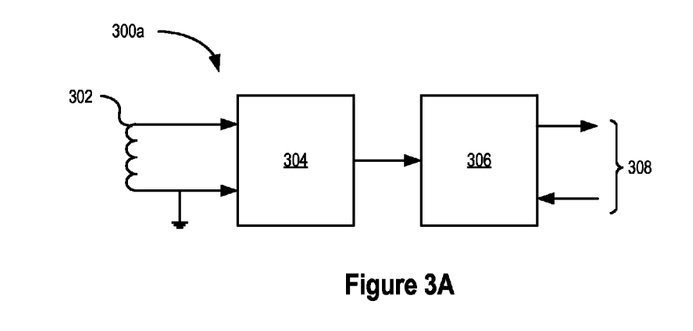
FIG. 3A illustrates a block diagram of an exemplary channel for measuring a current in connection with determining a HFR response consistent with embodiments disclosed herein.

FIG. 3A illustrates a block diagram of an exemplary channel 300a for measuring a current in connection with determining a HFR response consistent with embodiments disclosed herein. As illustrated, the current measurement channel 300a may include, without limitation, a Rogowski coil AC current sensor 302 coupled to an integrator and signal conditioning circuit 304. In some embodiments, the Rogowski coil AC current sensor 302 may comprise a non-Ferro magnetic current transducer and may be configured to different the AC signal and capture small AC signals in the presence of large DC currents. The integrator and signal conditioning circuit 306 may integrate and narrow the bandwidth of the AC current signal (e.g., via a low pass filter) and restore the original signal for post processing concentrating on the area of signal interest while reducing anti-aliasing for digital capture.

The output of the integrator and signal conditioning circuit 304 may be provided to an analog-to-digital ("A/D") converter 306 in communication with an associated microprocessor via one or more communication channels 308. The A/D converter 306 may be configured to shift the level of the received signal and convert the signal into a digital signal (e.g., a 16-bit digital signal). After the conversion, the A/D may provide the converted signal to a microprocessor via one or more communication channels 308, which in turn may extract the amplitude of the current at the desired frequencies.

Figure 3B:
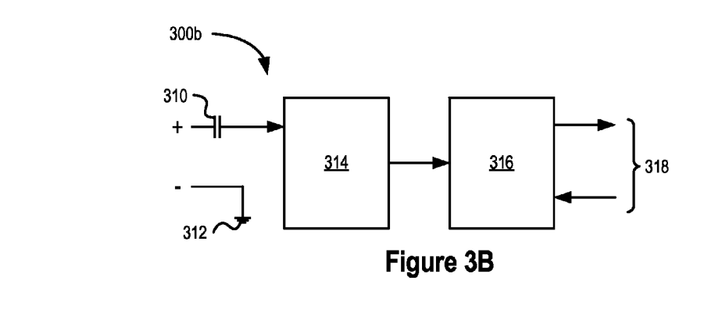
FIG. 3B illustrates a block diagram of an exemplary channel for measuring a voltage in connection with determining a HFR response consistent with embodiments disclosed herein.

FIG. 3B illustrates a block diagram of an exemplary channel 300b for measuring a voltage in connection with determining a HFR response consistent with embodiments disclosed herein. As illustrated, the voltage measurement channel 300b may comprise a measurement capacitor 310 coupled to a positive terminal of the FC stack (the negative terminal being coupled to an isolated reference 312). The measurement capacitor 310 may block the DC voltage content. The amplifier and signal conditioning circuit 314 may amplify the signal to improve the signal quality and then pass the amplified signal through a low pass filter to narrow the bandwidth of the AC voltage signal to desired frequencies of interest and may reduce anti-aliasing in the signal for digital capture.

The output of the amplifier and signal conditioning circuit 314 may be provided to an A/D converter 316 in communication with an associated microprocessor via one or more communication channels 318. The A/D converter 316 may be configured to shift the level of the received signal and convert the signal into a digital signal (e.g., a 16-bit digital signal). After the conversion, the A/D may provide the converted signal to a microprocessor via one or more communication channels 308, which in turn may extract the amplitude of the voltage at the desired frequencies.

Embodiments disclosed herein may utilize accurate and consistent measurement of HFR responses at multiple frequencies to detect anode contamination. In certain embodiments, HFR response measurements at different frequencies may be performance synchronously and/or sequentially within a timeframe such that the measured responses may be effectively compared for use in connection with the disclosed systems and methods. In further embodiments, measurement channels 300a, 300b may enable synchronous HFR response measurements at multiple frequencies while reducing processor loading.

In some embodiments, the measurement channels 300a, 300b may further allow for reduction in measurement variation and corruption between measurement points through linear measurement over an entire frequency range of interest. In certain embodiments, this may simplify the measurement data capture allowing for a single capture period and reduced measurement hardware. In further embodiments, synchronous measurement of HFR response may help to reduce any variation due to changing operating conditions during a measurement sampling process, thereby improving anode contamination detection.

Figure 4:
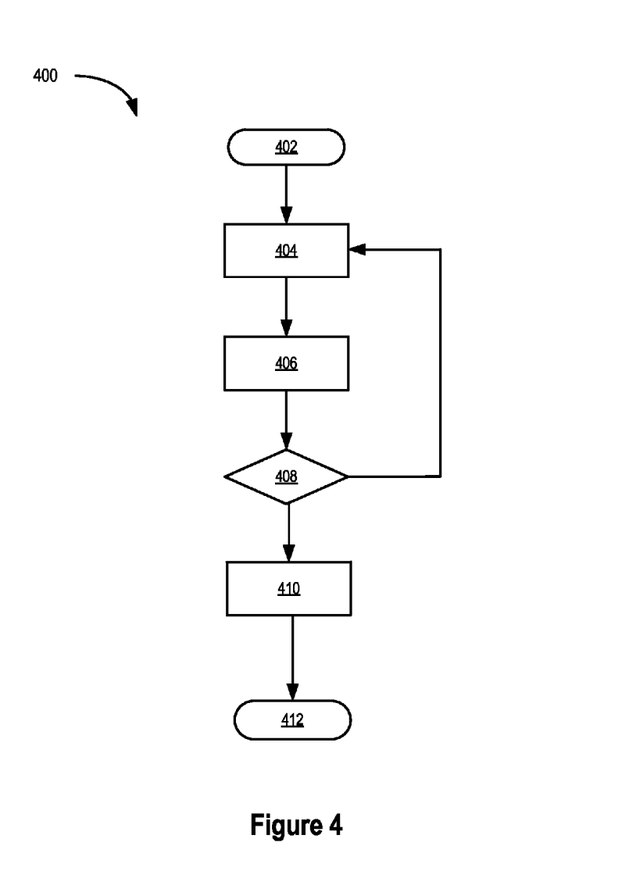
FIG. 4 illustrates a flow chart of an exemplary method for detecting anode contamination in a fuel cell system consistent with embodiments disclosed herein.

FIG. 4 illustrates a flow chart of an exemplary method 400 for detecting anode contamination in a FC system consistent with embodiments disclosed herein. In some embodiments, the illustrated method 300 and/or any of its constituent steps may be performed using, at least in part, a FC control system and/or any other suitable computer system.

The method 400 may initiate at 402. In certain embodiments, the method 400 may initiate based on a defined windowing strategy (e.g., at startup, shutdown, during certain power windows, etc.). At 404, a HFR response of the FC system at a first frequency may be measured. For example, in some embodiments, a HFR response of the FC system may be measured at 1 kHz.

At 406, a HFR response of the FC system at a second frequency may be measured. For example, in some embodiments, the HFR response of the FC system may be measured at 6 kHz. Consistent with embodiments disclosed herein, in certain embodiments, the HFR responses measured at 404 and 406 may be captured synchronously. In other embodiments, the responses may be captured asynchronously, but within a time period that the resulting HFR responses may be effectively compared to identify anode contamination.

The HFR response measured at the first frequency at 404 and the HFR responses measured at the second frequency at 406 may be compared at 408 to determine if a difference between the responses exceeds a threshold. In some embodiments, the threshold may be obtained through FC characterization testing, and may comprise a threshold HFR difference indicating a level of anode contamination where a recovery procedure should be initiated.

If the difference does not exceed the threshold, the method 400 may return to 406 and 408, where HFR responses at the first and second frequencies may be again obtained for comparison. If the difference between the HFR responses measured at the different frequencies exceeds the threshold, however, the method 400 may proceed to 410, where an anode contamination recovery procedure may be initiated.

In some embodiments, a recovery procedure may introduce oxygen into the FC stack so as to oxidize any contaminated CO in the anode, although any other suitable recovery procedure designed to recover performance losses associated with anode contamination may also be used in connection with the disclosed embodiments. For example, in some embodiments, a valve may connect an anode and a cathode. During a recovery procedure, the anode pressure may be made lower than the cathode pressure such that, when the valve is opened, air (e.g., 21% O2) is introduced in the anode, thereby oxidizing the contaminants. The method 400 may proceed to terminate at 412.

Figure 5:
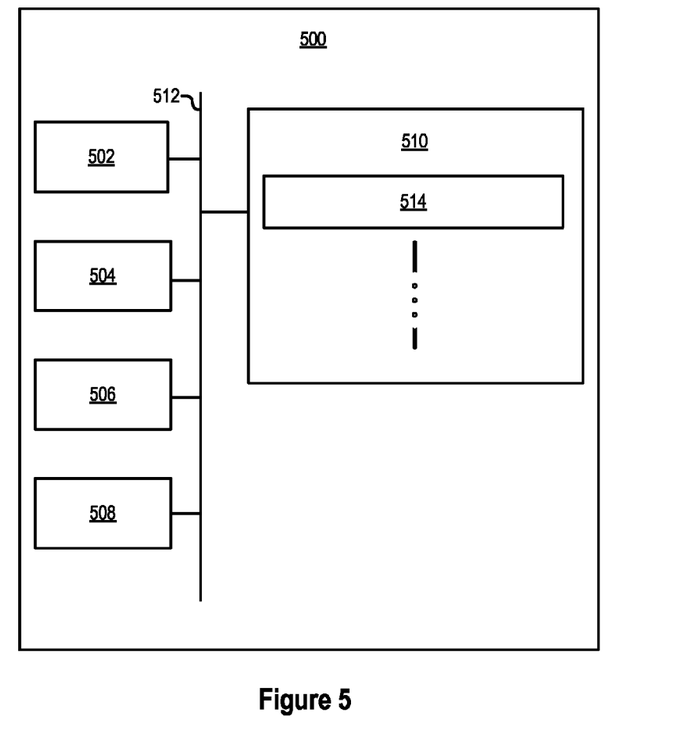
FIG. 5 illustrates a diagram of a system for implementing various embodiments of the disclosed systems and methods.

FIG. 5 illustrates a diagram of a system 500 for implementing various embodiments of the disclosed systems and methods. In certain embodiments, the computer system 500 may be a personal computer system, a server computer system, an on-board vehicle computer, an internal FC control system, an external FC control system, and/or any other type of system suitable for implementing the disclosed systems and methods. In further embodiments, the computer system 500 may be any portable electronic computer system or electronic device including, for example, a notebook computer, a smartphone, and/or a tablet computer.

As illustrated, the computer system 500 may include, among other things, one or more processors 502, random access memory ("RAM") 504, a communications interface 506, a user interface 508, and a non-transitory computer-readable storage medium 510. The processor 502, RAM 404, communications interface 506, user interface 508, and computer-readable storage medium 510 may be communicatively coupled to each other via a common data bus 512. In some embodiments, the various components of the computer system 500 may be implemented using hardware, software, firmware, and/or any combination thereof.

The user interface 508 may include any number of devices allowing a user to interact with the computer system 500. For example, the user interface 508 may be used to display an interactive interface to a user. The user interface 508 may be a separate interface system communicatively coupled with the computer system 500 or, alternatively, may be an integrated system such as a display interface for a laptop or other similar device. In certain embodiments, the user interface 508 may be produced on a touch screen display. The user interface 508 may also include any number of other input devices including, for example, keyboard, trackball, and/or pointer devices.

The communications interface 506 may be any interface capable of communicating with other computer systems, peripheral devices, and/or other equipment communicatively coupled to computer system 500. For example, the communications interface 506 may allow the computer system 500 to communicate with other computer systems (e.g., computer systems associated with external databases and/or the Internet), allowing for the transfer as well as reception of data from such systems. The communications interface 506 may include, among other things, a modem, a satellite data transmission system, an Ethernet card, and/or any other suitable device that enables the computer system 500 to connect to databases and networks, such as LANs, MANs, WANs and the Internet. In further embodiments, the communications interface 506 may further be capable of communication with one or more sensors (e.g., current sensors, voltage sensors) and/or other systems configured to measure and/or otherwise provide information for use in connection with the disclosed embodiments.

Processor 502 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 502 may be configured to execute computer-readable instructions stored on non-transitory computer-readable storage medium 510. Computer-readable storage medium 510 may store other data or information as desired. In some embodiments, the computer-readable instructions may include computer executable functional modules 514. For example, the computer-readable instructions may include one or more functional modules configured to implement all or part of the functionality of the systems and methods described above. Specific functional models that may be stored on computer-readable storage medium 510 may include a module configured to coordinate measurement of and/or otherwise determine a HFR response of a FC system at a plurality of frequencies, a module configured to compare a difference between measured HFR responses with a threshold, a module configured to initiate a recovery procedure based on the comparison, and a module configured to otherwise control associated recovery procedures, and/or any other module or modules configured to implement the systems and methods disclosed herein.

Although the foregoing has been described in some detail for purposes of clarity, it will be apparent that certain changes and modifications may be made without departing from the principles thereof. Certain features of the embodiments disclosed herein may be configured and/or combined in any suitable configuration or combination. Additionally, certain systems and/or methods disclosed herein may be utilized in FC systems not included in a vehicle (e.g., a backup power battery system or the like). It is noted that there are many alternative ways of implementing both the processes and apparatuses described herein. Further, although discussed in terms of measuring and comparing HFR responses of a FC system taken at two frequencies, it will be appreciate that embodiments of the disclosed systems and methods may be utilized in connection with any suitable number of multiple frequencies. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. Various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A method for initiating a recovery procedure in a fuel cell system performed by a system comprising a processor and a communicatively-coupled non-transitory computer readable storage medium storing instructions that, when executed by the processor, cause the processor to perform the method comprising:
    measuring a first high frequency resistance response of the fuel cell system at a first frequency;
    measuring a second high frequency resistance response of the fuel cell system at a second frequency, the second frequency being a different frequency than the first frequency, the first high frequency resistance response and the second high frequency resistance response being measured synchronously;
    determining a difference between the first high frequency resistance response and the second high frequency resistance response;
    comparing the difference with a threshold; and
    initiating a recovery procedure in the fuel cell system based on the difference exceeding the threshold.

2. The method of claim 1, wherein the first frequency comprises a frequency in a first frequency range and the second frequency comprises a frequency in a second frequency range, the second frequency range being higher than the first frequency range.

3. The method of claim 1, wherein the threshold comprises a threshold indicating a threshold level of anode contamination in the fuel cell system.

4. The method of claim 3, wherein the anode contamination comprises carbon monoxide contamination in the fuel cell system and the recovery procedure comprises introducing oxygen in the fuel cell system to oxidize the carbon monoxide.

5. The method of claim 1, wherein the first high frequency resistance response and the second high frequency resistance response are measured using a single current measurement channel and voltage measurement channel.

6. The method of claim 1, wherein the fuel cell comprises a single cell.

7. The method of claim 1, wherein the fuel cell comprises a plurality of cells.

8. A non-transitory computer-readable storage medium storing instructions that, when executed by a processor, cause the processor to perform a method for initiating a recovery procedure in a fuel cell system comprising:
    measuring a first high frequency resistance response of the fuel cell system at a first frequency;
    measuring a second high frequency resistance response of the fuel cell system at a second frequency, the second frequency being a different frequency than the first frequency, the first high frequency resistance response and the second high frequency resistance response being measured synchronously;
    determining a difference between the first high frequency resistance response and the second high frequency resistance response;
    comparing the difference with a threshold; and
    initiating a recovery procedure in the fuel cell system based on the difference exceeding the threshold.

9. The non-transitory computer-readable storage medium of claim 8, wherein the first frequency comprises a frequency in a first frequency range and the second frequency comprises a frequency in a second frequency range, the second frequency range being higher than the first frequency range.

10. The non-transitory computer-readable storage medium of claim 8, wherein the threshold comprises a threshold indicating a threshold level of anode contamination in the fuel cell system.

11. The non-transitory computer-readable storage medium of claim 10, wherein the anode contamination comprises carbon monoxide contamination in the fuel cell system and the recovery procedure comprises introducing oxygen in the fuel cell system to oxidize the carbon monoxide.

12. The non-transitory computer-readable storage medium of claim 8, wherein the first high frequency resistance response and the second high frequency resistance response are measured using a single current measurement channel and voltage measurement channel.

13. The non-transitory computer-readable storage medium of claim 8, wherein the fuel cell comprises a single cell.

14. The non-transitory computer-readable storage medium of claim 8, wherein the fuel cell comprises a plurality of cells.

* * * * *